E. STANCLIFF.
RAILWAY WHEEL.
APPLICATION FILED MAY 7, 1914.
1,117,271.  Patented Nov. 17, 1914.
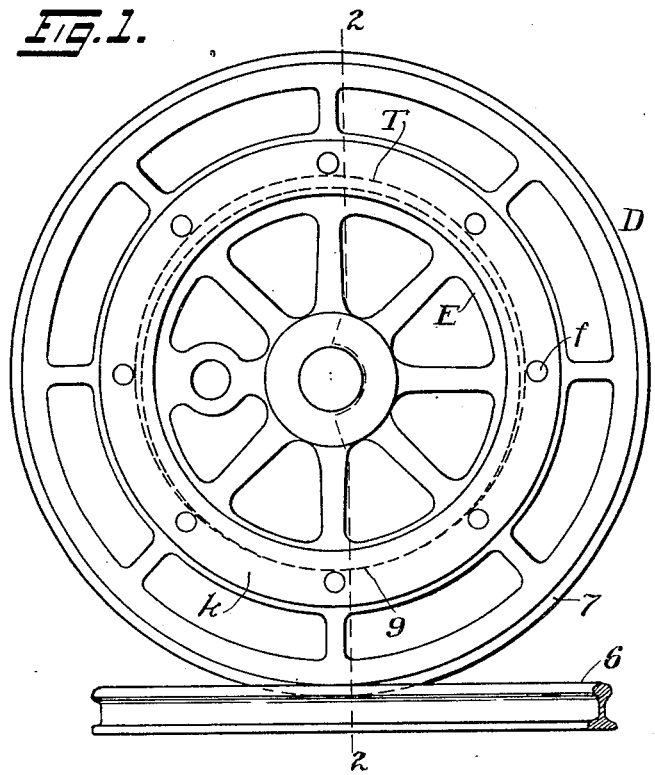
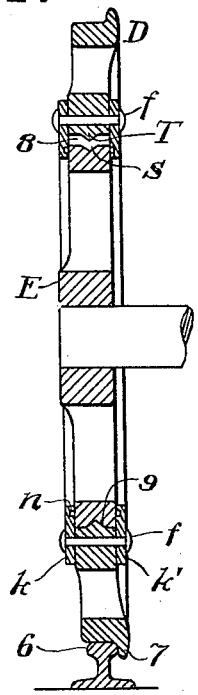
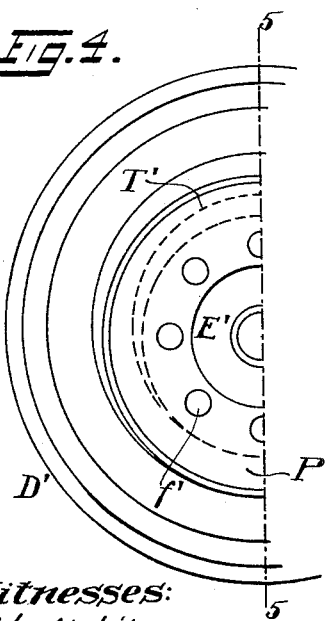
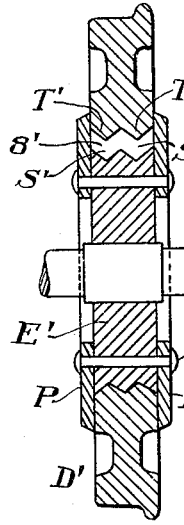
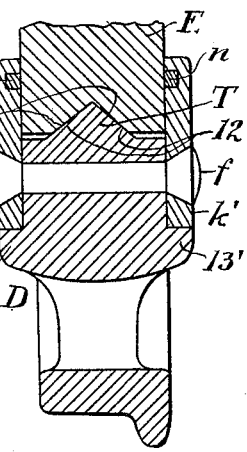
Witnesses:
Chas. E. Whitman.
H. D. Penney.
Inventor:
Edwin Stancliff.
By his Att'y, F. H. Richards.

UNITED STATES PATENT OFFICE.

EDWIN STANCLIFF, OF NEW YORK, N. Y.

RAILWAY-WHEEL.

1,117,271. Specification of Letters Patent. Patented Nov. 17, 1914.

Application filed May 7, 1914. Serial No. 836,863.

*To all whom it may concern:*

Be it known that I, EDWIN STANCLIFF, a citizen of the United States, residing in New York city, in the county of New York and State of New York, have invented certain new and useful Improvements in Railway-Wheels, of which the following is a specification.

This invention relates to wheels for railway and other vehicles.

A principal object of my present improvements is to furnish an improved wheel of the off-center type, especially adapted for use where the tread of the wheel is subjected to lateral stresses or shocks.

For illustrating my present improvements I have herein shown and described the same as applied to two varieties of wheels for railway service, but the improvement is adapted for use in wheels for various kinds of cars, automobiles and other vehicles.

In the accompanying drawing forming a part of this specification, Figure 1 is a side elevation of a locomotive driver made in accordance with my present invention; Fig. 2 is a sectional view on line 2—2 of Fig. 1; Fig. 3 is an enlarged view of the lower portion of Fig. 2, for more clearly illustrating certain details and certain variations in the arrangement of these details; Fig. 4 is a side elevation of a car wheel, but for convenience of illustration only one half of the wheel is shown, at the left-hand of the vertical line 5—5; Fig. 5 is a sectional view of the car wheel shown in Fig. 4, the section being taken on the line 5—5, Fig. 4.

Similar characters designate like parts in all of the views.

Referring to Figs. 1 and 2, the driver wheel D is shown resting on a rail 6, and is provided with the usual flange 7. The wheel D is shown surrounding, and somewhat larger than, center wheel E, the difference in diameters being indicated by the space at 8, Fig. 2. In practice, as will be evident, the space 8 may be varied considerably in accordance with the eccentricity which may be desired as regards the position of the center wheel E within the driving or outer wheel D. The inner side or track of the wheel-member D being larger in diameter than the diameter of the outer track of the inner wheel-member, E, of course the member, E, will run within, and revolve more rapidly than, the outer member D; and accordingly the member D is said to be the "orbital" member, since it has a progressive rotation about the inner member, while the wheel is in use.

In the car wheel shown in Figs. 4 and 5, the outer wheel D' surrounds the inner wheel E' and a considerable space at 8' indicates the eccentricity of the center wheel relatively to the outer wheel or orbital member, of the complete off-center wheel. The greater the eccentricity, the larger, of course, will be the described orbital movement.

In the preferred form thereof indicated in Figs. 1, 2 and 3, the wheel D is shown provided with an inwardly projecting track, or bearing-zone, T, which engages within a V-shaped and depressed track-zone S (see Fig. 2) so that on the lower side of the driving wheel, as indicated at 9, Figs. 1 and 2, the center wheel will have a rigid lateral engagement with the outer wheel D by means of coacting bearing faces which are sharply inclined relatively to each other; in Fig. 3, these track faces of the center wheel E are indicated by 10, while corresponding faces of the wheel D are indicated by 12. When the wheel is thus interlocked along the lower side thereof, and is then subjected to lateral stresses,—such, for instance, as occur in railway practice,—it is evident that the forces so produced will be transmitted upwardly through the orbital wheel D into the central member or wheel E through the said inclined zones or faces, as 10 and 12, so that the weight carried upon the axle and pressing downwardly upon the wheel D will tend to hold the two wheel members D and E in firm engagement. In practice, it is deemed desirable to usually make the mid-track and angularly-disposed faces, as 10 and 12, Fig. 3, inclined at a considerable angle; and while it is deemed preferable to employ straight-line profiles or angles as shown for instance in Fig. 3,—so that the engaging surfaces consist of narrow bearing zones on conical and oppositely-disposed surfaces of large diameter,—in some cases those lines may be slightly curved should this be deemed desirable in any particular instance; but this variation is so simple a matter that it will be obvious without a special illustration thereof.

In the variety or style of wheel shown in Figs. 4 and 5, which is especially intended for use on railway cars (particularly on cars for use on electric roads), a plurality of the engaging track zones is shown. In the sectional view, Fig. 5, the wheel member D' is provided with two inwardly-projecting, or elevated, track-zones T', T'', which engage in two depressed and V-shaped track-zones S', S'', of corresponding shape and proportions. In this form of wheel, when transverse blows come upon the lower side of the wheel member D', the force of the blow is transmitted upwardly to the center wheel E' through the said coacting surfaces of the projecting tracks T', T'', to the respective surfaces of the depressed tracks S', S''. In this form of the wheel, therefore, the engagement between the outer and inner wheels, at and adjacent to the lower side thereof,—as shown in Figs. 1 and 2,—is effected through a plurality of similarly formed track-zones or bearing surfaces, the profiles of which have an angular position relatively to the wheel axis. It will, of course, be understood from the foregoing description as herein illustrated, that when the said coacting track surfaces have their profile lines considerably inclined,—as shown, for instance, in Fig. 3,—there will be a considerable amount of adhesive friction or driving engagement formed as between the two principal wheel members, as D and E, or D' and E'. This organization and arrangement of the two wheel members and their engaging track surfaces favors the proper operation of said members, particularly by somewhat increasing the otherwise normal amount of adhesive action. Also it should be understood that the plurality of sets of driving faces or track faces, as illustrated in Fig. 5, is particularly applicable for wheels for use as locomotive drivers of various styles and proportions, and for various kinds of railway service.

A further feature of my present improvements relates to the combination in connection with the features hereinbefore described, of retaining means,—which may comprise or consist of one or more rings or plates which may be designated as keeper plates,—the chief purpose of which is to retain or keep the two wheel-members in proper relation throughout that portion of their circumference where the same are not otherwise in engagement. Owing to the eccentricity of the wheel-members, as D and E, when in their working positions, herein illustrated, the said keeper plates are operative for the purpose described throughout the greater part of their circumference, but are substantially inoperative adjacent to the engaging portion of the wheel-members at the lower side thereof; this is clearly indicated in Figs. 2 and 5.

In Figs. 1 and 2 the keeper plates are designated by $k$, $k'$ and are shown as being affixed or rigidly connected to the outer or orbital wheel-member D by means of fastening devices at $f$, $f$, which devices may be rivets,—as indicated in the drawing,—or may be some other well-known or suitable kind of fastening, or may be an ordinary kind of removable bolt. These features are also illustrated in Fig. 3 and are there designated by the same reference characters. But in this figure the wheel member D is shown formed with guard rims 13, 13', extending over the outer edges of the said keeper plates $k$, $k'$. Also in Fig. 3 the said keeper plates are shown having a packing ring, as $n$, which may consist of any suitable and well-known packing material,—such as fiber, rubber, leather, or the like,—located in grooves formed in the inner surface and near the inner edge of the said keeper plates. These packings, or combined packing and oiling rings, as $n$, $n$, serve to keep dirt from working in between the center wheel E and the said keeper plates, and may also serve as a wick for carrying lubricating material for preventing undue abrasive action between the contacting surfaces. The projecting track-zone on one said wheel member being fitted for engaging in a corresponding depressed track-zone on the other wheel member, constitutes an effective means for transmitting the force of lateral shocks from one said wheel member to the other, while the keeper-rings, as $k$, $k'$, constitute a retaining means arranged for keeping the two wheel members in position in that portion of the circumference of the wheel where the said track-zones are not in engagement.

In the form of wheel shown in Figs. 1, 2 and 3, the keeper plates are, as above described, applied to the outer wheel member D, but in Figs. 4 and 5 I have shown similar keeper plates $p$, $p'$ secured by fastenings $f'$ to the center wheel E. In practice the outwardly projecting keeper plates $p$, $p'$ may be provided near their outer edges and on their inner surfaces with packing rings corresponding to those above described in connection with Fig. 3.

In the operation of this off-center wheel, shocks transmitted through the lower side of the member D or D', are received directly by the member E or E', respectively, without passing through any intermediate and separate part or device, thereby relieving the keeper plates, or other retaining device, of the heavy duty and destructive action to which such plates or devices would otherwise be subjected.

Having thus described my invention, I claim:—

1. In an off-center vehicle-wheel, the combination with an outer orbital wheel-member provided with an inner track for an inner wheel-member, and with an inner wheel-member having an outer track of a less diameter than the diameter of said inner track of the outer wheel-member whereby said inner wheel-member is adapted to run within and eccentrically to said outer wheel-member, of a combined guiding and shock-transmitting means comprising a projecting track-zone on one said wheel member fitted for engaging in a corresponding depressed track-zone on the other wheel member and arranged for transmitting the force of lateral shocks from one said wheel-member to the other, and retaining means arranged for keeping the two wheel members in position in that portion of the circumference of the wheel where the said track-zones are not in engagement.

2. In an off-center vehicle-wheel, the combination with an outer orbital wheel-member provided with an inner track for an inner wheel-member, and with an inner wheel-member having an outer track of a less diameter than the diameter of said inner track of the outer wheel-member whereby said inner wheel-member is adapted to run within and eccentrically to said outer wheel-member, of a combined guiding and shock-transmitting means comprising a projecting track-zone of said outer wheel-member fitted for engaging in a corresponding depressed track-zone of the said inner wheel-member and arranged for transmitting the force of lateral shocks from one said wheel-member to the other, and retaining means arranged for keeping the two wheel members in position in that portion of the circumference of the wheel where the said track-zones are not in engagement.

3. In an off-center vehicle wheel, the combination with an outer orbital wheel-member provided with an inner track for an inner wheel-member, and with an inner wheel-member having an outer track of a less diameter than the diameter of said inner track of the outer wheel-member whereby said inner wheel-member is adapted to run within and eccentrically to said outer wheel-member, of a combined guiding and shock-transmitting means comprising a projecting track-zone on one said wheel member fitted for engaging in a corresponding depressed track-zone on the other wheel member and consisting of oppositely-inclined bearing faces arranged for transmitting the force of lateral shocks from one said wheel-member to the other, and retaining means arranged for keeping the two wheel members in position in that portion of the circumference of the wheel where the said track-zones are not in engagement.

4. In an off-center vehicle-wheel, the combination with an outer orbital wheel-member provided with an inner track for an inner wheel-member, and with an inner wheel-member having an outer track of a less diameter than the diameter of said inner track of the outer wheel-member whereby said inner wheel-member is adapted to run within and eccentrically to said outer wheel-member, of a combined wheel-member engaging and shock-transmitting means comprising a projecting zone on one said wheel member fitted for engaging in a corresponding depressed zone on the other wheel member and consisting of oppositely-inclined faces arranged for transmitting the force of lateral shocks from one said wheel-member to the other, and retaining means arranged for keeping the two wheel members in position in that portion of the circumference of the wheel where the said track zones are not in engagement.

5. In an off-center vehicle-wheel, the combination with an outer orbital wheel-member provided with an inner track for an inner wheel-member, and with an inner wheel-member having an outer track of a less diameter than the diameter of said inner track of the outer wheel-member whereby said inner wheel-member is adapted to run within and eccentrically to said outer wheel-member, of a combined guiding and shock-transmitting means comprising a projecting track-zone on one said wheel member fitted for engaging in a corresponding depressed track-zone on the other wheel member and consisting of oppositely-inclined bearing faces arranged for transmitting the force of lateral shocks from one said wheel-member to the other, and retaining means comprising a keeper-ring affixed to one said wheel-member and engaging the other said wheel-member, and arranged for keeping the two wheel members in position in that portion of the circumference of the wheel where the said track zones are not in engagement.

EDWIN STANCLIFF.

Witnesses:
F. C. Lewis,
Louis A. Lathrop.